United States Patent Office 3,045,131
Patented July 17, 1962

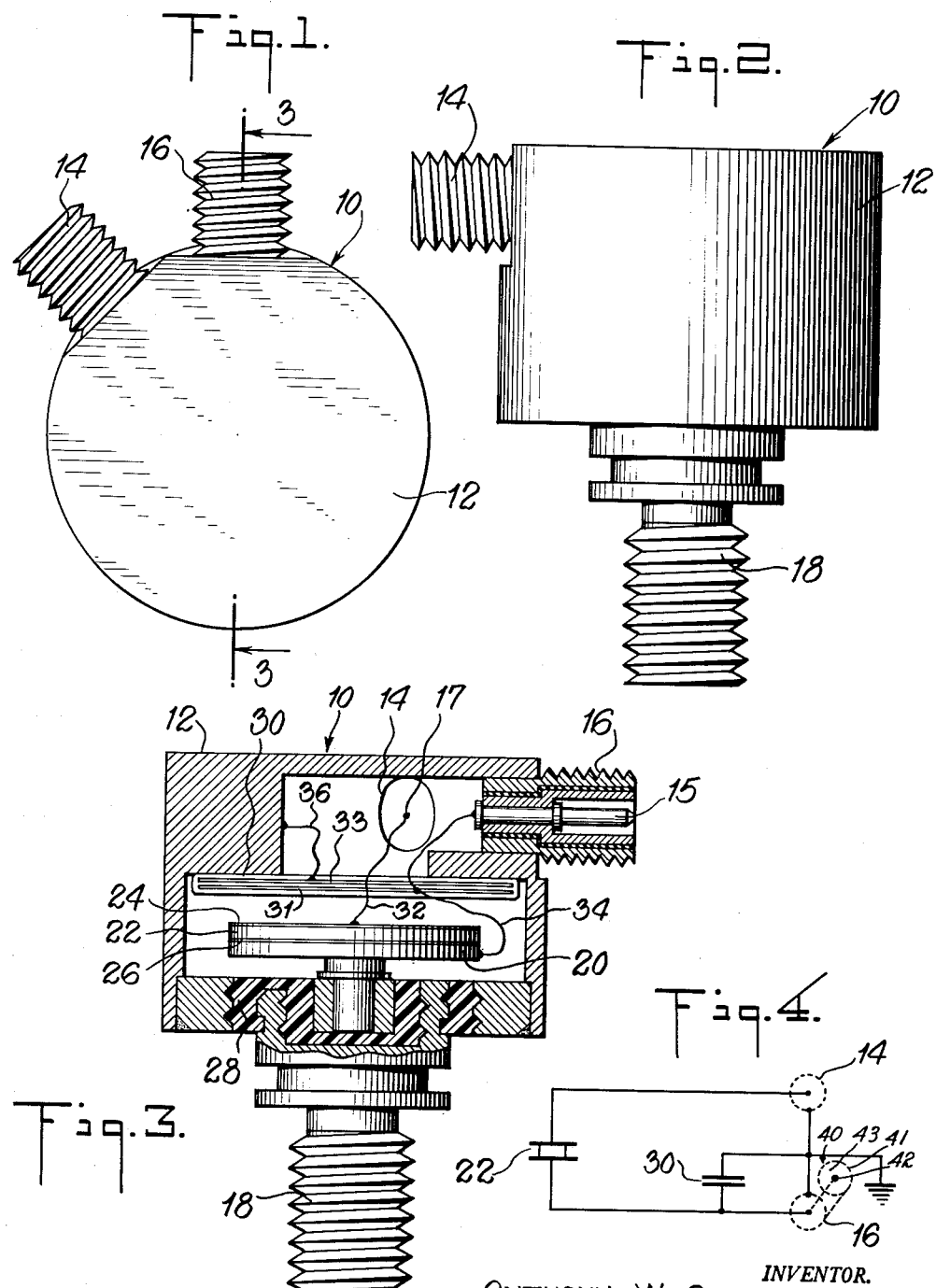

3,045,131
ACCELEROMETER
Anthony W. Orlacchio, Fords, N.J., assignor to Gulton Industries, Inc., Metuchen, N.J., a corporation of New Jersey
Filed Nov. 16, 1959, Ser. No. 853,145
5 Claims. (Cl. 310—8.4)

My invention relates to accelerometers and in particular to an accelerometer using a piezoelectric ceramic transducer and having a shunt capacitor within its housing with means for taking off the output with or without the shunt capacitor.

In the prior art accelerometers, when both a low capacity and a high capacity output were desired, it was necessary to connect the capacitor across the output of the accelerometer external to the accelerometer housing to obtain the high capacity connection. Some prior art eccelerometers were made with a high capacity output but none of them had selectable high and low capacity outputs.

The high capacity output can be fed directly into a vacuum tube voltmeter, oscilloscope or other laboratory type measuring equipment without the need of a matching cathode follower. The low capacity output (direct from the transducer) is desirable for measuring lower "g" levels since it has higher sensitivity and resolution than the high capacity output. However, the low capacity output must be fed into a cathode follower and then into the measuring equipment. This is done in order to obtain a proper impedance match, especially at the low frequencies.

It is an important object of my invention to provide an accelerometer having a piezoelectric ceramic transducer and selectable outputs, one of the outputs being a high capacity output, the other being a low capacity output.

It is a further object of my invention to provide such an accelerometer in which a shunt capacitor is mounted in the accelerometer housing.

It is a still further object of my invention to provide such an accelerometer wherein the housing is insulated from the body under observation.

These and other objects, advantages, uses and features will be apparent during the course of the following description when taken in connection with the accompanying drawings wherein:

FIGURE 1 is a plan view of a preferred embodiment of an accelerometer of my invention, FIGURE 2 is an elevational view of the accelerometer of FIGURE 1, FIGURE 3 is a cross-sectional view along the line 3—3 of FIGURE 1, and FIGURE 4 is a schematic diagram of the electrical circuit of the accelerometer of FIGURES 1 through 3.

In the drawings, wherein, for the purpose of illustration is shown a preferred embodiment of accelerometer of my invention, the numeral 10 designates the accelerometer generally. Accelerometer 10 is seen to comprise housing 12, connectors 14 and 16 and mounting stud 18 (FIGURES 1 and 2). In FIGURE 3, there is shown armature 20 to which is affixed piezoelectric ceramic transducer 22 having electrodes 24 and 26 applied thereto in any manner well-known in the art. The transducer in conjunction with the mounting illustrated is mass-loaded due to its design as has been described in U.S. Patent 2,808,522 to Abraham I. Dranetz. Armature 20 is press fit into housing 12 and is insulated therefrom and from stud 18 by insulating ring 28. Capacitor 30, having plates 31 and 33, is mounted within housing 12 and is formed of high dielectric material such as barium titanate, lead titanate-zirconate or any other similar material.

The shells of connectors 14 and 16 are pressed into housing 12 and make electrical connection to the housing. The housing is formed of a metal such as steel, titanium or aluminum and the connector shells are formed of similar material. Electrical lead 32 makes connection between electrode 24 and pin 17 of connector 14 and lead 34 connects electrode 26 to plate 31 and then to pin 15 of connector 16. Plate 33 of capacitor 30 is connected to housing 12 by means of lead 36.

The particular accelerometer shown and described herein is of the ungrounded mushroom type but the teachings of my invention may also be applied to other types of seismic elements as well as to the grounded types. I choose to form the transducer of my accelerometers of a piezoelectric ceramic such as barium titanate, lead titanate-zirconate, or similar material but any other transducer type or material may be used as long as it is an electro-mechanically sensitive transducer. Included in the foregoing are other artificial piezoelectrics, natural piezoelectrics, electrostrictives and magnetostrictives.

Accelerometer 10 is assembled as follows: armature 20 with transducer 22 affixed thereto is pressed into the base of housing 12; plate 33 of capacitor 30 is connected to housing 12 by means of lead 36; plate 31 of capacitor 30 is connected to electrode 26 of transducer 22 (low side) and to pin 15 of connector 16 by means of lead 34; electrode 24 of transducer 22 (the high side) is connected to pin 17 of connector 14; capacitor 30 is potted into the housing with a glass epoxy resin which completely encapsulates it and protects against failure due to vibration and moisture. Now, connectors 14 and 16 are pressed into housing 12 and the accelerometer is ready for operation. The capacitance of capacitor 30 is approximately 9000 micromicrofarads and when it is connected in parallel with transducer 22, the output capacitance is 10,000 micromicrofarads. When the output is taken directly from transducer 22, the output capacitance is 1000 micromicrofarads. With the shunt capacitance connected, the sensitivity is of the order of 5 millivolts per g while with the output taken directly from the transducer, the sensitivity is of the order of 35 millivolts per g.

FIGURE 4 illustrates the electrical circuit of accelerometer 10. A female shorting connector digrammatically identified by reference numeral 40 is provided with its shell 41 and center socket 42 tied together electrically as by a conductor 43 is used in connection with accelerometer 10. When the female shorting connector is connected to connector 16 as indicated in FIG. 4, capacitor 30 is shorted out and the output of transducer 22 alone is taken from connector 14. When the female shorting connector is connected to connector 14, the output of transducer 22 shunted by capacitor 30 is taken from connector 16.

While I have described my invention in relation to a specific example and in a specific embodiment, I do not wish to be limited thereto, for obvious modifications will occur to those skilled in the art without departing from the spirt and scope of my invention.

Having thus decribed my invention, I claim:

1. An accelerometer comprising a housing, a first electrical connector and a second electrical connector affixed to said housing and each comprising an outer conductive shell and an inner contact insulated from the associated shell, a mass-loaded piezoelectric ceramic transducer mounted within said housing, said transducer having a pair of electrodes affixed thereto, a capacitor mounted within said housing, the shells of said electrical connectors being electrically grounded to said housing, one electrode of said transducer being electrically connected to one side of said capacitor and to an ungrounded contact of said second electrical connector, the other electrode of said transducer being electrically connected to an ungrounded contact of said first electrical connector, the other side of said capacitor being electrically connected to said housing.

2. An accelerometer as described in claim 1 including means for selectively shorting said electrical connectors to the associated shells whereby when said second electrical connector is shorted the output from said accelerometer is taken directly from the transducer through said first electrical connector and when said first electrical connector is shorted the output from said accelerometer is taken from said transducer shunted by said capacitor.

3. An accelerometer as described in claim 1 including mounting means mechanically affixed to said housing and wherein said mounting means is electrically insulated from said transducer.

4. An accelerometer as described in claim 1 wherein said transducer is composed largely of barium titanate.

5. An accelerometer as described in claim 1 wherein said transducer is composed largely of lead titanate-zirconate.

References Cited in the file of this patent
FOREIGN PATENTS
909,257   Germany _____ Apr. 15, 1954